Figure 1:
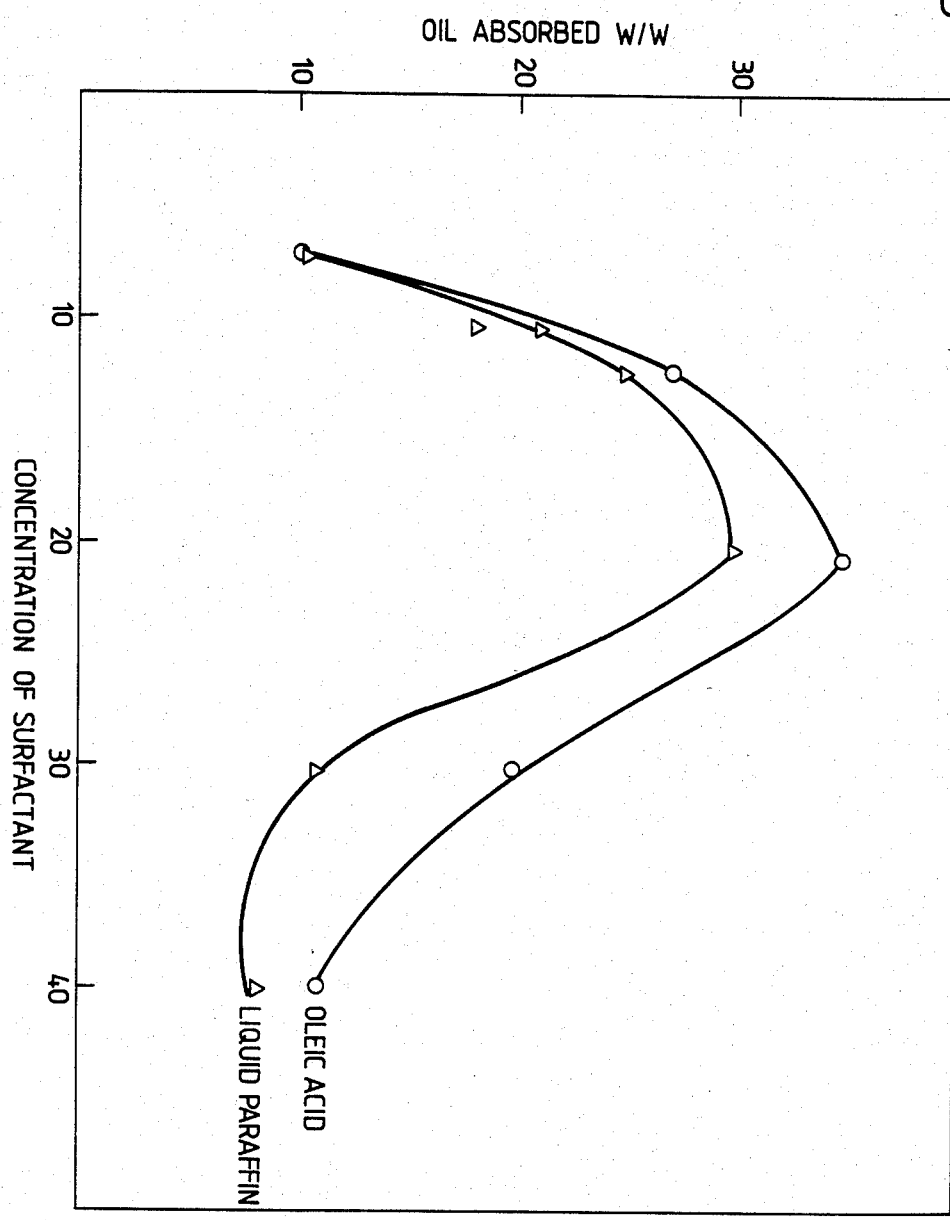

United States Patent [19]

Barby et al.

[11] Patent Number: 4,522,953

[45] Date of Patent: Jun. 11, 1985

[54] LOW DENSITY POROUS CROSS-LINKED POLYMERIC MATERIALS AND THEIR PREPARATION AND USE AS CARRIERS FOR INCLUDED LIQUIDS

[75] Inventors: Donald Barby, Chester; Zia Haq, Wirral, both of England

[73] Assignee: Lever Brothers Company, New York, N.Y.

[21] Appl. No.: 653,612

[22] Filed: Sep. 24, 1984

Related U.S. Application Data

[63] Continuation of Ser. No. 355,291, Mar. 8, 1982.

[30] Foreign Application Priority Data

Mar. 11, 1981 [GB] United Kingdom ............... 8107658
Jun. 26, 1981 [GB] United Kingdom ............... 8119740

[51] Int. Cl.$^3$ ............................................. C08J 9/28
[52] U.S. Cl. ........................................ 521/64; 521/56; 521/61; 521/62; 521/63; 521/150
[58] Field of Search .................. 521/61, 62, 63, 64, 521/56, 150

[56] References Cited

U.S. PATENT DOCUMENTS

| Re. 27,444 | 7/1972 | Will | 521/138 |
|---|---|---|---|
| 3,255,127 | 6/1966 | von Bonin et al. | |
| 3,256,219 | 6/1966 | Will | 521/138 |
| 3,734,867 | 5/1973 | Will | 521/138 |
| 3,763,056 | 10/1973 | Will | 521/138 |
| 3,988,508 | 10/1976 | Lissant. | |
| 4,039,489 | 8/1977 | Fletcher et al. | |

FOREIGN PATENT DOCUMENTS

| 933 | 8/1977 | European Pat. Off. |
|---|---|---|
| 1544690 | 7/1969 | Fed. Rep. of Germany. |
| 1167979 | 10/1969 | United Kingdom. |
| 1291649 | 10/1972 | United Kingdom. |
| 1428125 | 3/1976 | United Kingdom. |
| 1458203 | 12/1976 | United Kingdom. |
| 1493356 | 11/1977 | United Kingdom. |
| 1576228 | 10/1980 | United Kingdom. |
| 2000150 | 5/1982 | United Kingdom. |

OTHER PUBLICATIONS

"Surfactant Science Series", vol. 6, Emulsion and Emulsion Technology, Part 1, edited by K. J. Lissant, Marcel Dekker, Inc., 1974.

"Properties of High-Internal Phase Emulsions, Effect of Emulsifier Parameters", J. Nixon and A. Beerbower, American Chemical Society Meeting, Apr. 13-18, 1969, pre-print 14, 49-59, 1969.

*Primary Examiner*—Morton Foelak
*Attorney, Agent, or Firm*—Milton L. Honig; James J. Farrell

[57] ABSTRACT

Cross-linked homogenous porous polymeric materials are prepared by polymerization of monomers as the continuous phase in a high internal phase emulsion having above a critical limit of surfactant to ensure adequate absorbtivity. The porous materials may be dried and refilled with selected liquids and act as a high capacity reservoir.

9 Claims, 1 Drawing Figure

LOW DENSITY POROUS CROSS-LINKED POLYMERIC MATERIALS AND THEIR PREPARATION AND USE AS CARRIERS FOR INCLUDED LIQUIDS

This is a continuation application of Ser. No. 355,291 filed Mar. 8, 1982.

This invention relates to porous polymeric materials; more particularly to cross-linked polymeric materials of exceptionally low density and high absorbency and to methods of their production and to such polymeric materials containing in their pores included liquids.

It has previously been proposed in U.S. Pat. No. 4,039,489 to prepare relatively low density oil absorbent polymeric materials in the form of polystyrene and polyurethane foams using various foaming agents. In British Pat. No. 1,291,649 proposals have been made to prepare a relatively low density, oil absorbent, polymeric foam by the inclusion of a volatile material into a pre-polymer and then rapidly reducing pressure and permitting the volatile material to expand the polymeric material to generate the foam.

In U.S. Pat. No. 3,988,508 Lissant has disclosed the production of polymeric materials by polymerisation of an oil-in-water emulsion system having a high internal phase ratio of monomer to water, preferably 85-95%, although the disclosure is of monomer water ratios in the range 20:80 to 95:5 without a cross-linking agent.

The study of high internal phase emulsions has been carried out for many years and the basic theory behind their preparation and structure has been discussed by K. J. Lissant in "Surfactant Science Series", Vol. 6, "Emulsion and Emulsion Technology", Part 1, edited by K. J. Lissant, Marcel Dekker Inc., New York, 1974. In this work Lissant discusses the geometrical packing of droplets in high internal phase emulsions and suggests that especial care must be exercised in selecting emulsifying agents for such compositions and that, in the region of 94-97% volume percentage of internal phase, critical changes occur in the high internal phase emulsion (HIPE). Beerbower, Nixon, Philippoff and Wallace of Esso Research and Engineering Company have studied high internal phase emulsions as safety fuels, such compositions containing at least 97% by weight of hydrocarbon fuel (ref. American Chemicals Society, Petro-chemical Pre-prints, 14, 79-59, 1969).

In U.S. Pat. No. 3,255,127, polymeric materials are disclosed which are prepared by polymerisation in reversed emulsion. In this specification a relatively small proportion of water is emulsified into a mixture of emulsifier, catalyst and monomer and the emulsion so produced is mixed into a far larger proportion of water, usually containing a stabiliser such as polyvinyl alcohol, which keeps the droplets of reversed emulsion in a relatively stable form. Polymerisation takes place in a period of the order of 24 hours at 55° C. to yield particulate polymer or polymer block which can readily be broken down to give a particulate polymer.

In British Pat. No. 1,576,228 AKZO disclosed the production of thermoplastic microporous cellular structures comprising microcells having an average diameter of 0.5-100 microns with smaller diameter pores connecting the microcells. These structures are made by dissolving a suitable thermoplastic polymer in a solvent at elevated temperature and then cooling the solution to solidify the polymer and then removing the liquid from the thermoplastic polymer structure. This process is clearly limited in its application to polymers which can readily be dissolved in appropriate solvents.

In British Pat. No. 1,513,939, Ceskoslovenska Akademie Ved also disclosed the production of porous polymers, but these are formed as porous beads which may be coalesced to form a moulding which will clearly not be homogeneous or uniform in its porosity. The porous beads are prepared by dissolving the polymer to be used in a solvent and ten dispersing the solution into a compatible carrier liquid and this mixture is added to a coagulating liquid such as water to precipitate the porous beads of polymer. This process is also limited in that if cross-linked polymers are desired they can only be produced by a random linking of pre-formed linear polymer chains.

British Specification No. 2,000,150 discloses the production and use of cross-linked polymeric porous beads. The beads may be used to extract components from liquid mixtures and typically have a pore volume of 2.42 ml/g and are hard enough to be packed into absorbency columns.

British Specification No. 1,458,203 suggests the preparation of shaped cellular articles by curing an emulsion containing up to 90 parts by weight of water to 10 parts by weight of polymerisable mixture.

In British Pat. No. 1,428,125, ICI commented on the desirability of maximising the water content of water extended polymers, but they suggest that difficulty was experienced in obtaining water-in-oil emulsions with water contents in excess of 88% by weight water.

It has now been found that homogeneous porous cross-linked polymer blocks can be prepared which have a very low density, a high capacity of absorbing and retaining liquids and, due to their cross-linked polymeric nature, an ability to carry liquids significantly better than that of hitherto known porous thermoplastic compositions.

In addition, these cross-linked polymers have a greater dimensional stability than that of polymers which possess a significant elasticity due to their lack of cross-linking.

The present invention provides a porous homogeneous cross-linked polymeric block material having a dry density of less than 0.1 g/cc, and formed as a cross-linked porous structure having a pore volume of more than 9 cc/g and an absorbency for hydrophobic liquids defined in terms of oleic acid of at least 7 cc/g. The porous material provided by this invention comprises a series of pores interlinked with pinhole apertures, hence giving a material of exceptional absorbency.

The present invention provides such a porous polymeric material in which the pore system may contain an included liquid or air or other gaseous material.

Accordingly, the present invention also provides a porous polymeric material having a dry density of less than 0.1 g/cc, preferably from 0.02 to 0.08 g/cc, comprising linked pores having a pore volume of more than 9 cc/g, preferably more than 15 cc/g, and containing in the pores an aqueous or non-aqueous liquid.

The polymer/liquid composite of the invention preferably consists to an extent of at least 90%, preferably at least 95%, by weight of liquid, defined in terms of water.

Because of the structure of the polymer the liquid is retained in the pore system of the polymer and has little or no tendency to escape under the influence of gravity, but it can readily be expressed by pressing at hand pressure the cross-linked polymer block.

After the liquid has been expressed from the block, the non-elastic polymer block does not regain its original shape or pore structure.

The transfer or replacement of included liquid from the polymer may be carried out in various ways.

With many liquids which adequately wet the polymer transfer can be achieved by diffusion of the liquids.

In the case of liquids for which the polymer does not have a high affinity, for example, aqueous liquids, the transfer operation may be vacuum-assisted.

Clearly this absorbency will be related both to the hydrophobicity of the absorbate and to its viscosity. Likewise, if the absorbate acts as a solvent for the cross-linked polymeric material, again, absorbency will be reduced since the structure of the polymeric material will be lost.

It has been observed from microscopic inspection of samples of the porous polymer that it essentially comprises a series of substantially spherical, thin-walled cavities having a plurality of holes in the walls interconnecting the adjacent cavities. Frequently six or more holes can be seen in the cavities on inspection of electron-micrographs of polymer samples. It has been determined that the absorbency in terms of maximum oil uptake is related to the size of the cavities, expressed in terms of voids diameter and the number and size of the holes in the cavity walls, expressed in terms of pinholes.

In general it is desirable that the average pinhole diameter should not be less than $0.5\mu$ and the average void diameter should be at least 20% greater than that figure.

The mechanism by which the holes form in the thin-walled cavities is not fully understood. However, experimental work suggests that it is related to the quantity of surfactant present and its compatibility with the cross-linked polymer and, hence, also, to the degree of cross-linking in the polymer. It is thought that prior to polymerisation the high internal phase emulsion consists of three main elements: monomer and surfactants in the continuous phase and water in the internal phase. The continuous phase, which consists of a homogeneous solution of surfactant and the monomer and cross-linking agent and, in this situation, the surfactant is compatible with the monomer mixture. It is thought that at this stage there are no interconnecting holes present in the external phase. During polymerisation chain propagation takes place and as the surfactant is not polymerisable and has no reactive sites in its structure, it cannot take part in the polymerisation reaction. As a result, the surfactant molecules separate because the surfactant is no longer compatible with the growing polymeric structure and is also insoluble in the water phase. Due to the nature of a surfactant, the aggregated molecules of surfactant remain part of the polymer phase and probably cause the production of weak spots and subsequent pinhole formation in the cross-linked polymer film.

The homogeneous structure of the porous polymer blocks provided by this invention can be contrasted with the structure obtained by compressing together polymer beads.

Clearly, when porous polymer beads are compressed and bonded together to form a block, many of the cavities and interconnecting pores on the surface of the beads will be blocked and form non-homogeneous zones in the polymer block and the compressive forces applied will further increase the density of the porous polymer in these non-homogeneous zones.

In the blocks provided by this invention the interior of the blocks is homogeneous and, if the outer skin of the blocks, which is formed in contact with the container of the emulsion, is removed, then the blocks are homogeneous and uniform in pore and cavity distribution.

Another factor affecting the structure of the porous cross-linked polymer is the structure of the high internal phase emulsion from which it is formed. This can most readily be defined in concepts of viscosity and Table I and II indicate the effect of stirrer speed on two typical emulsions and show the viscosity of emulsions produced at different stirrer speeds and the detailed structure of the cross-linked porous polymers produced from the emulsions at the different stirring rates.

The basic emulsion used in the work shown in Table I contained 10 ml styrene, 1 ml divinyl benzene and 2 grams of Span 80 and 200 ml water containing 0.2% sodium persulphate. The emulsion used for the work in Table II was the same except that 300 ml water were used and in each case the preparation was carried out generally as described in Example I below.

The emulsions were prepared at stirrer speed of 200 rpm and after all the components had been mixed the samples of the emulsion were stirred at the speeds shown in the Tables for 30 minutes prior to cross-linking to yield the porous cross-linked polymer samples.

Viscosity measurements were made used using Brookfield Viscometer fitted with a 'C' spindle at, as shown in the Tables, 10 and 20 rpm.

TABLE I

| Motor Speed (RPM) | Viscosity of emulsion for polymerisation | | | | Structure of cross-linked polymer (average) | |
|---|---|---|---|---|---|---|
| | 10 RPM Viscometer Reading | × 10³ poise | 20 RPM Viscometer Reading | × 10³ poise | Sphere size (um) | Interconnecting pore size (um) |
| 200 | 12.3 | 12.3 | 14.5 | 7.3 | 38.4 | 5.3 |
| 300 | 21.8 | 21.8 | 24.5 | 12.3 | 25.1 | 4.1 |
| 500 | 23.2 | 23.2 | 26.5 | 13.3 | 15.4 | 2.8 |
| 800 | 50.8 | 50.8 | 55.0 | 27.5 | 9.1 | 1.6 |
| 1000 | 60.8 | 60.8 | 69.9 | 35.0 | 8.1 | 1.4 |
| 2000 | 100+ | 100+ | | | 7.1 | 1.0 |

TABLE II

| Motor Speed (RPM) | Viscosity of emulsion for polymerisation | | | | Structure of cross-linked polymer (average) | |
|---|---|---|---|---|---|---|
| | 10 RPM Viscometer Reading | × 10³ poise | 20 RPM Viscometer Reading | × 10³ poise | Sphere size (um) | Interconnecting pore size (um) |
| 200 | 7.1 | 7.1 | 8.0 | 4.0 | 45.8 | 5.4 |
| 300 | 13.5 | 13.5 | 15.0 | 7.5 | 20.0 | 4.0 |
| 500 | 18.8 | 18.8 | 21.5 | 10.8 | 17.1 | 2.4 |
| 800 | 34.9 | 34.9 | 42.4 | 21.2 | 11.7 | 1.5 |
| 1000 | 39.7 | 39.7 | 46.6 | 23.3 | 8.4 | 1.5 |
| 1500 | 43.4 | 43.4 | 54.1 | 27.1 | 9.0 | 1.3 |
| 2000 | 55.6 | 55.6 | 61.8 | 30.9 | 7.7 | 0.95 |

It will be seen from the tables that the emulsion viscosity has a clear relationship with the pore or cavity size of the cross-linked polymer and with the size of the holes or interconnecting passages between the cavities. Clearly by selecting the appropriate stirrer speed and hence viscosity of the emulsion the size of the cavities in the cross-linked polymer can be quite closely controlled.

Various monomers may be used in the preparation of the porous polymers provided by this invention and a preferred polymer is a lightly cross-linked polystyrene containing a small proportion of divinylbenzene. Additionally, the polymeric materials have been made using various acrylate polymers cross-linked with, for example, allyl methacrylate.

In general it will be noted that the ratio of sphere or cavity size to the size of the interconnecting pore or pinhole is of the order of 7:1.

Preferably, the polymerisation catalyst is in the water phase and polymerisation occurs after transfer of the catalyst into the oil phase. Alternatively, the polymerisation catalyst may be introduced directly into the oil phase. Suitable water-soluble catalysts include potassium persulphate and various redox systems such as ammonium persulphate together with sodium metabisulphite. Monomer soluble catalysts include azodibisisobutyronitrile (AIBN), benzoyl peroxide and di-2-ethyl-hexyl-peroxydicarbonate. The temperature at which the polymerisation is carried out can be varied fairly widely between about 30° and 90° C., but is clearly related to the particular catalyst initiator employed.

The surfactant used in making the high internal phase emulsion which is to be polymerised is fairly critical, although the long-term stability of the high internal phase emulsion is not an important factor provided that it is long enough to maintain stability during polymerisation. Using the well known HLB terminology in relation to the surfactants, it is desirable that the surfactant has an HLB value of less than 6 and more than 2, preferably about 4. Providing the HLB criterion is met, many surfactants can be used in the preparation of the porous cross-linked polymers. Amongst those suitable may be included:

| | HLB |
|---|---|
| Nonionic | |
| Sorbitan monoleate (Span 80) | 4.3 |
| Glycerol monoleate | 3.8 |
| Glycerol monoricinoleate | 4.0 |
| PEG 200 dioleate | 4.6 |
| Partial fatty acid esters of polyglycerol (Admul Wol 1403 ex Food Industries Limited of Bromborough, England) | |
| Castor oil 5-10 EO | 3-6 |
| Cationic | |
| Distearyl dimethyl ammonium chloride | 5-6 |
| Dioleyl dimethyl ammonium chloride | 5-6 |
| Anionic | |
| Bis-tridecyl sulphosuccinic acid (Na salt) | 5-6 |

Experimental work has shown that the amount of surfactant in the system is critical and that if insufficient surfactant is employed the cavities have insufficient holes to generate the desired absorbency.

An indication of this effect is shown in FIG. 1 of the accompanying drawings which shows the effect of the concentration of surfactant on the oil-absorptive abilities of a 96.5% internal phase emulsion prepared as described in Example I of this specification. From this work it will be apparent that the optimum concentration of surfactant by weight of monomers is of the order of 20%, but useful results can be obtained in the range 5 to 30% and, preferably, 15-25%.

The polymers provided by this invention can be prepared by first forming a water-in-oil high internal phase emulsion system where the oil phase is constituted by the monomer or mixture of monomers, together with a small amount of a cross-linking agent. The polymerisation initiator or catalyst can be dissolved in either the water phase or in the oil (monomer) phase. The high internal phase emulsion system is prepared by the slow addition of the aqueous internal phase to the oil (monomer) phase in which the emulsifying agent (surfactant) is preferably dissolved, using a moderate shear stirring. Conveniently the container in which the polymerisation is carried out is enclosed to minimise the loss of volatile monomers and the emulsions are thermally polymerised in the container. The water in the cavities or voids in the polymer structure can be exchanged for other liquids or readily removed by subjecting the polymer to a vacuum, or leaving the material to dry in a dry atmosphere at between about 30° and 60° C. Liquids can then be reintroduced into the dried polymer, preferably after removing the air under reduced pressure.

The present invention also provides a process for the preparation of a homogeneous porous cross-linked polymeric block material in which the monomers are polymerised in the form of a high internal phase emulsion comprising, as the internal phase, at least 90% by weight of the emulsion of water; the remainder of polymerisable monomers, and from 5 to 30% by weight of the monomers of surfactant and from 0.005 to 10% by weight of the monomers of a polymerisation catalyst.

The container can be of any convenient shape to ensure that the block prepared can be in the desired shape for its intended end-use and does not restrict the process to containers in which agglomeration of beads under pressure can be carried out.

The homogeneous porous cross-linked polymeric block material provided by this invention may be washed and dried to yield an absorbent block which is especially useful for the absorption of hydrophobic materials such as oils. The block material is capable of retaining at least 10 times its own weight of liquid defined in terms of water, preferably at least 15 times and, in its most preferred form, at least 35 times its own weight of water, up to a possible maximum of 65 times its weight of water.

The process provided by this invention may be modified in that instead of using water as the internal phase, an aqueous liquid may be used which contains a useful solute. Such a polymerisation in situ method can of course be used only for aqueous liquids that do not destabilise the high internal phase emulsion. It is not suitable, for example, for liquids containing high HLB surfactants which would destabilise the emulsion.

One class of liquids that is suitable for inclusion by polymerisation in situ is comprised of solutions of oxygen bleaches, especially hydrogen peroxide-based bleaches.

The following examples illustrate the preparation of the porous polymeric materials provided by this invention.

The words "Span", "Antarox" Polyhipe and "Admul" are trade marks.

EXAMPLE 1

10 ml of styrene, 0.5 ml commercial divinylbenzene containing 0.25 ml ethyl vinylbenzene, 2 g emulsifier (Sorbitan monoleate Span 80) were mixed together in a plastic beaker at 15° C., a protective film was placed over the beaker after the stirrer was positioned to reduce the evaporation of the monomers. The stirrer speed was adjusted to about 300 rpm, 0.7 gm of potassium persulphate was dissolved in 350 ml of distilled water and the resulting solution was then added into the beaker drop by drop until the total 350 ml of the solution had been added. In this way a thick creamy white stable emulsion was obtained and this emulsion was polymerised in a sealed plastic container at 50° C. for three days. The resulting water-filled polymer was cut into small blocks and was dried under a dry atmosphere at 25°–30° C. The dried polymer has a semi-flexible structure and interconnected voids. This polymer, when placed in oleic acid, absorbed at least 30 times its own weight of the acid in about 10 minutes; also when the polymer was placed in a mixture of oleic acid and water it absorbed effectively only the oleic acid. The polymer had a dry density of 0.037 g/cc and a pore volume of 27 cc/g.

EXAMPLE 2

10 ml styrene, 0.25 divinylbenzene, 2 ml Span 80 were mixed together at 25° C. in a plastic beaker. 300 ml of 0.25% solution of potassium persulphate in distilled water was added to the monomer phase and polymerisation was carried out at 60° C. for 8 hours by exactly the same procedure as described in Example I. This polymer, when placed in heavy grade liquid paraffin of density at 20° C., 0.870–0.890 and viscosity 178 CP at 25° C. it absorbed about 20 times its own weight of the paraffin. The polymer had a dry density of 0.044 g/cc and a pore volume of 22 cc/g.

EXAMPLE 3

8.5 ml of styrene, 1.0 ml monooctyl itaconate, 0.5 ml divinylbenzene, 0.2 ml di-2-ethyl hexyl peroxydicarbonate (as an initiator) and 2 ml of nonyl phenol/1.5 EO-Antarox C 0210 were mixed together at 15° C. 200 ml of distilled water was added into the monomer phase and polymerisation was carried out at 50° C. for 24 hours, following the same procedure as set out in Example I. This polymer, when placed in oleic acid, absorbed about 15 times its own weight of oleic acid. The polymer had a dry density of 0.061 g/cc and a pore volume of 16 cc/g.

EXAMPLE 4

5 ml of styrene, 5 ml of butyl methacrylate, 0.25 ml of allyl methacrylate (as a cross-linking agent) and 2 ml of Span 80 were mixed together at 20° C. in a plastic beaker. 300 ml of 0.2% solution of potassium persulphate was added to the monomer phase and polymerisation was carried out by exactly the same procedure as described in Example 1. The dried polymer, when placed in perfume, absorbed about 50 times its own weight of perfume and subsequently released it very slowly. The dried polymer had a flexible structure.

EXAMPLE 5

10 ml styrene, 1 ml divinylbenzene (50% ethyl vinylbenzene), 2 g Span 80 were mixed together. 450 ml of 0.2% solution of sodium persulphate in distilled water was added to the monomer phase and the resulting emulsion was polymerised in exactly the same way as described in Example 1. The polymer, when dried, absorbed about 40 times its own weight of oleic acid. After removing the soluble impurities by methanol, using a soxhlet extractor, the polymer absorbed about 43 times its own weight of oleic acid. The dry density of the polymer after drying was 0.025 cc/g and the emulsion contained 97.8% dispersed aqueous phase.

EXAMPLES 6 TO 27

Using the general procedures set out in Example 1 work was carried out using the materials set out below and in Table III which gives data on Examples Nos. 6 to 27.

TABLE III

| Constituents | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|---|---|
| A (ml) | 10 | 10 | 10 | 10 | 5 | 5 | 5 | 10 | | 9 | 9 | 5 | 1 | 8 |
| B (ml) | | | | | | | | | 5 | | | | | |
| C (ml) | | | | | | | | | | | 1 | | | 2 |
| D (ml) | | | | | | | | | | | | 1 | | |
| E (ml) | 1 | 1 | 1 | 1 | 0.5 | 0.5 | 0.5 | 1 | 0.5 | 1 | 1 | 5 | 9 | |
| F (ml) | | | | | | | | | | | | | | 1 |
| G (g) | | | | | | | 1 | | | | | | | |
| H (g) | 2 | 2 | 2 | 1 | | | | 1 | 1 | 2 | 2 | 2 | 2 | 2 |
| J | | | | | | 1 | | | | | | | | |
| K | | | | | 1 | | | | | | | | | |
| L | | | | | | | | | 2 | | | | | |
| N (% on monomer) | | | | | | | | | | | | | | |
| O (ml) | 300 | 200 | 150 | 100 | 100 | 100 | 100 | 200 | 100 | 300 | 300 | 300 | 300 | 200 |
| P (ml) | | | | | | | | | | | | | | |
| Q (% internal phase) | 0.2 | 0.2 | 0.2 | 0.08 | 0.15 | 0.15 | 0.15 | 0.2 | 0.5 | 0.2 | 0.2 | 0.1 | 0.1 | |
| R (% internal phase) | | | | | | | | | | | | | | 0.1 |
| S (% internal phase) | | | | | | | | | | | | | | |
| Properties | | | | | | | | | | | | | | |
| % internal phase to monomers | 96.5 | 94.8 | 93.2 | 90.1 | 94.8 | 94.8 | 94.8 | 94.8 | 94.8 | 96.5 | 96.5 | 96.5 | 96.5 | 94.8 |
| Appox. oil uptake (w/w) | 23 | 12 | 10 | 8 | 12 | 13 | 13 | 12 | 15 | 24 | 24 | 20 | 20 | 13 |
| Approx. dry density g/cm² | 0.04 | 0.065 | 0.082 | 0.099 | 0.06 | 0.06 | 0.06 | 0.065 | *0.055 | 0.04 | 0.040 | 0.045 | 0.042 | 0.06 |

| Constituents | Ex. 20 | Ex. 21 | Ex. 22 | Ex. 23 | Ex. 24 | Ex. 25 | Ex. 26 | Ex. 27 |
|---|---|---|---|---|---|---|---|---|
| A (ml) | 10 | 10 | 10 | 10 | 15 | 15 | 15 | 15 |
| B (ml) | | | | | | | | |
| C (ml) | | | | | | | | |

TABLE III-continued

| | | | | | | | | |
|---|---|---|---|---|---|---|---|---|
| D (ml) | | | | | | | | |
| E (ml) | 1 | 1 | 1 | 1 | 1 | 1 | 1 | 1 |
| F (ml) | | | | | | | | |
| G (g) | | | | | | | | |
| H (g) | 2 | 2 | 2 | 2 | 1 | 2 | 3 | 4 |
| J | | | | | | | | |
| K | | | | | | | | |
| L | | | | | | | | |
| N (% on monomer) | 1 | | | | | | | |
| O (ml) | 200 | 200 | 240 | 100 | 200 | 200 | 200 | 200 |
| P (ml) | | | 60 | 100 | | | | |
| Q (% internal phase) | | | 0.2 | 0.2 | 0.2 | 0.2 | 0.2 | 0.2 |
| R (% internal phase) | | | | | | | | |
| S (% internal phase) | | 0.1 | | | | | | |
| Properties | | | | | | | | |
| % internal phase to monomers | 94.8 | 94.8 | 96.5 | 94.8 | 92.6 | 92.6 | 92.6 | 92.6 |
| Approx. oil uptake (w/w) | 12 | 12 | 24 | 13 | 9 | 12 | 11 | 10 |
| Approx. dry density g/cm³ | 0.06 | 0.06 | *0.034 | *0.06 | 0.08 | 0.078 | 0.083 | 0.087 |

Key to materials used in Examples 6-27 and set out in Table III
Materials used in external phase
A   styrene
B   butyl styrene
C   butyl methacrylate
D   ethyl methacrylate
E   approx. 50% divinylbenzene + 50% ethyl vinyl benzene
F   Allyl methacrylate
G   N—octadecyl succinic acid
H   Span 80 (sorbiton mono-oleate)
J   Ethomeen 18/12 (bis-(2-hydroxyethyl)octadecylamine)
K   Arodobs (Dob 102 acid + Arromox DMHTD alkyl benzene sulphonic acid + dimethyl hardened tallow, amine oxide)
L   Admul wal 1403 (partial fatty acid esters of polyglycerol)
N   benzyl peroxide
Materials used in internal phase
O   water
P   glycerol
Q   sodium persulphate
R   potassium persulphate
S   2,2-azobis-(2-amidenopropane)hydrochloride
*Dry density after washing with methanol/water.

EXAMPLE 28

Poly(hipe) with Silica Particles 10 ml styrene, 1 ml divinylbenzene (50 ethyl vinyl benzene), 1 g Span 80 and 1.5 g silica (Aerosil R972 ex Degussa) were mixed together. 200 ml of 0.5% sodium persulphate was added to the above mixture and polymerised by the method described in Example 1. After drying, the resulting polymer absorbed about 10 times its own weight of oleic acid.

EXAMPLE 29

Preparation of Porous Polymer Containing a Streak-Free Cleaning Composition

A liquid cleaning composition was prepared as follows:

| | % by weight |
|---|---|
| C₁₂-C₁₅ primary straight-chain alcohol, condensed with 7 moles of ethylene oxide | 10 |
| Partial ester of a styrene-maleic anhydride copolymer, neutralised to the sodium salt (av. mol. wt. 10,000; theor. acid no. 190) | 2 |
| Demineralised water, perfume to | 100 |

This composition was then diluted 100-fold in demineralised water.

A polymer was prepared as described in Example 2 and dried under a dry atmosphere at 25°-30° C. The dried polymer was washed out several times with ethanol, using a Soxhlet extractor, and then dried again in a dry atmosphere at 25°-30° C. It was then filled under vacuum with the diluted liquid composition given above. The liquid uptake was 96% by weight.

The resulting polymeric material containing a liquid cleaning composition was a solid block feeling only slightly damp to the touch. Liquid could be expelled only by pressing or squeezing.

EXAMPLE 30

With Hydrogen Peroxide

| | |
|---|---|
| Styrene | 10 ml |
| DVB | 1 ml |

-continued

| Span 80 | 28 g |
| --- | --- |
| Water (25% hydrogen peroxide 0.2% potassium persulphate) | 300 ml |

The cross-linked polymer containing $H_2O_2$ was used as a stain remover on textile fabric.

EXAMPLE 31

Large Scale Preparation (26 Kg)

| Styrene | 800 ml |
| --- | --- |
| DVB | 80 ml |
| Span 80 | 160 g | were mixed together at 20° C. in a hydrophobic container, 25 l of water (+0.2% sodium persulphate) were added (12 l/hour) to the monomer phase with moderate stirring (using a helical paddle stirrer coated with PTFE).

The resulting emulsion was polymerised at 60° C. overnight and yielded a block of homogeneous cross-linked polymer according to this invention.

We claim:

1. A porous homogeneous cross-linked vinyl polymeric block material formed from a water-in-oil emulsion, said emulsion containing at least 90% by weight water, the polymeric block material having a dry density of less than 0.1 g/cc and formed as a cross-linked porous structure having a pore volume of more than 9 cc/g and an absorbency for hydrophobic liquids defined in terms of oleic acid of at least 7 cc/g.

2. A porous homogenous cross-linked polymeric block material as claimed in claim 1 having a dry density from 0.02 to 0.08 cc/g.

3. A porous homogenous cross-linked polymeric block material as claimed in claim 1 and containing, included in the pores, an aqueous or non-aqueous liquid.

4. A porous homogenous cross-linked polymeric block material as claimed in claim 1 capable of retaining at least 25 times its own weight of liquid defined in terms of water.

5. A porous homogeneous cross-linked polymeric block material as claimed in claim 4, capable of retaining at least 40 times its own weight of liquid defined in terms of water.

6. A process for the preparation of the homogeneous porous cross-linked polymeric block material in which the monomers are vinyl polymerised in the form of a water-in-oil high internal phase emulsion comprising, as the internal phase, at least, 90% by weight of the emulsion of water; the remainder of polymerisable monomers and from 5–30% by weight of the monomers of a surfactant with HLB value in the range 2–6 selected from the group consisting of anionic, nonionic, cationic types and mixtures thereof, and from 0.005 to 10% by weight of the monomers of a polymerisation catalyst.

7. A process as claimed in claim 6, in which the block material, having included water in its pores, is carefully dried to produce a dry polymer as claimed in claim 1.

8. A process as claimed in claim 6, in which the polymer, having included water in its pores, is exchanged with an aqueous solution or a non-aqueous liquid.

9. A process as claimed in claim 6, in which the water in the internal phase also contains a useful solute.

* * * * *